United States Patent
Drennen et al.

[19]

[11] Patent Number: 6,139,460
[45] Date of Patent: Oct. 31, 2000

[54] ELECTRIC CALIPER

[75] Inventors: David Bernard Drennen, Bellbrook; Brian Paul Heber, Delaware, both of Ohio

[73] Assignee: Delphi Technologies, Inc., Troy, Mich.

[21] Appl. No.: 09/317,344

[22] Filed: May 24, 1999

[51] Int. Cl.[7] .................................................. B60T 8/02
[52] U.S. Cl. ...................... 475/149; 188/72.1; 188/162
[58] Field of Search .................... 475/149; 188/72.1, 188/72.8, 158, 162

[56] References Cited

U.S. PATENT DOCUMENTS

| | | | |
|---|---|---|---|
| 4,793,447 | 12/1988 | Taig et al. | 188/72.1 |
| 4,804,073 | 2/1989 | Taig et al. | 188/72.1 |
| 4,836,338 | 6/1989 | Taig | 188/72.1 |
| 4,850,457 | 7/1989 | Taig | 188/72.1 X |
| 4,860,859 | 8/1989 | Yamtoh et al. | 188/72.1 |
| 5,829,557 | 11/1998 | Halasy-Wimmer et al. | 188/162 |
| 5,971,110 | 10/1999 | Martin | 188/72.1 |

OTHER PUBLICATIONS

"Standard Handbook of Machine Design" by Joseph E. Shigley and Charles Mischke, pp. 20.12–13, 1986.

*Primary Examiner*—Khoi Q. Ta
*Attorney, Agent, or Firm*—Robert M. Sigler

[57] ABSTRACT

An electric caliper for a brake system includes a cylindrical housing having a bore, a bridge extending from the housing, and a pair of friction elements operatively disposed under the bridge. The electric caliper also includes a motor disposed within the bore and a planetary gear system disposed within the bore and operatively connected to the motor. The electric caliper further includes a ball screw disposed within the bore and positioned around the motor and operatively connected to the planetary gear system. The electric caliper includes a piston operatively connected to the ball screw. Displacement of the piston causes the friction elements to operatively engage a disc disposed between the friction elements.

14 Claims, 3 Drawing Sheets

ELECTRIC CALIPER

TECHNICAL FIELD

The present invention relates generally to brakes for motor vehicles and, more particularly, to an electric caliper for a brake system in a motor vehicle.

BACKGROUND OF THE INVENTION

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock, also referred to as ABS, and electric, also referred to as "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the hydraulic fluid is eliminated. Instead, the application and release of the brake pad is controlled by an electric caliper.

Traditionally, hydraulic fluid is a very efficient means of transferring a load, since a brake system in an automotive vehicle must be able to transfer a load of about fourteen thousand (14,000) pounds. An electric brake system accomplishes this load transfer through the electric caliper. Generally, the electric caliper includes a motor and a gear system. Typically, either a few large gears or many small gears for the gear system are needed to achieve the comparable load transfer as the hydraulic fluid. Also, the geometry of the motor influences its efficiency, since the preferred shape is long and thin. However, there is a limited amount of space available in the wheel for packaging the type of gears or motor necessary to obtain the same load transfer as in the hydraulic brake system. Therefore, space limitations constrain the use of an electric caliper in an automotive vehicle. Thus, there is a need in the art to provide an electric caliper for a brake system that is efficient and can be packaged within the available space of a wheel.

SUMMARY OF THE INVENTION

Accordingly, the present invention is an electric caliper for a brake system. The electric caliper includes a cylindrical housing having a bore. The electric caliper also includes a bridge extending from the housing and a pair of friction elements operatively disposed under the bridge. The electric caliper also includes a motor disposed within the bore and a planetary gear system disposed within the bore and operatively connected to the motor. The electric caliper further includes a ball screw disposed within the bore and positioned around the motor and operatively connected to the planetary gear system. The electric caliper still further includes a piston operatively connected to the ball screw. Displacement of the piston causes the friction elements to operatively engage a disc of the brake system disposed between them.

One advantage of the present invention is that an electric caliper is provided for a brake system that can be packaged within the available space of a wheel. Another advantage of the present invention is that the electric caliper includes a ball screw. Yet another advantage of the present invention is that the electric caliper has the ball screw positioned around a motor which effectively increases gear reduction capability of the ball screw.

Other features and advantages of the present invention will be readily appreciated as the same becomes better understood after reading the subsequent description when considered in connection with the accompanying drawings.

DETAILED DESCRIPTION OF THE PREFERRED EMBODIMENT

Figure 1:
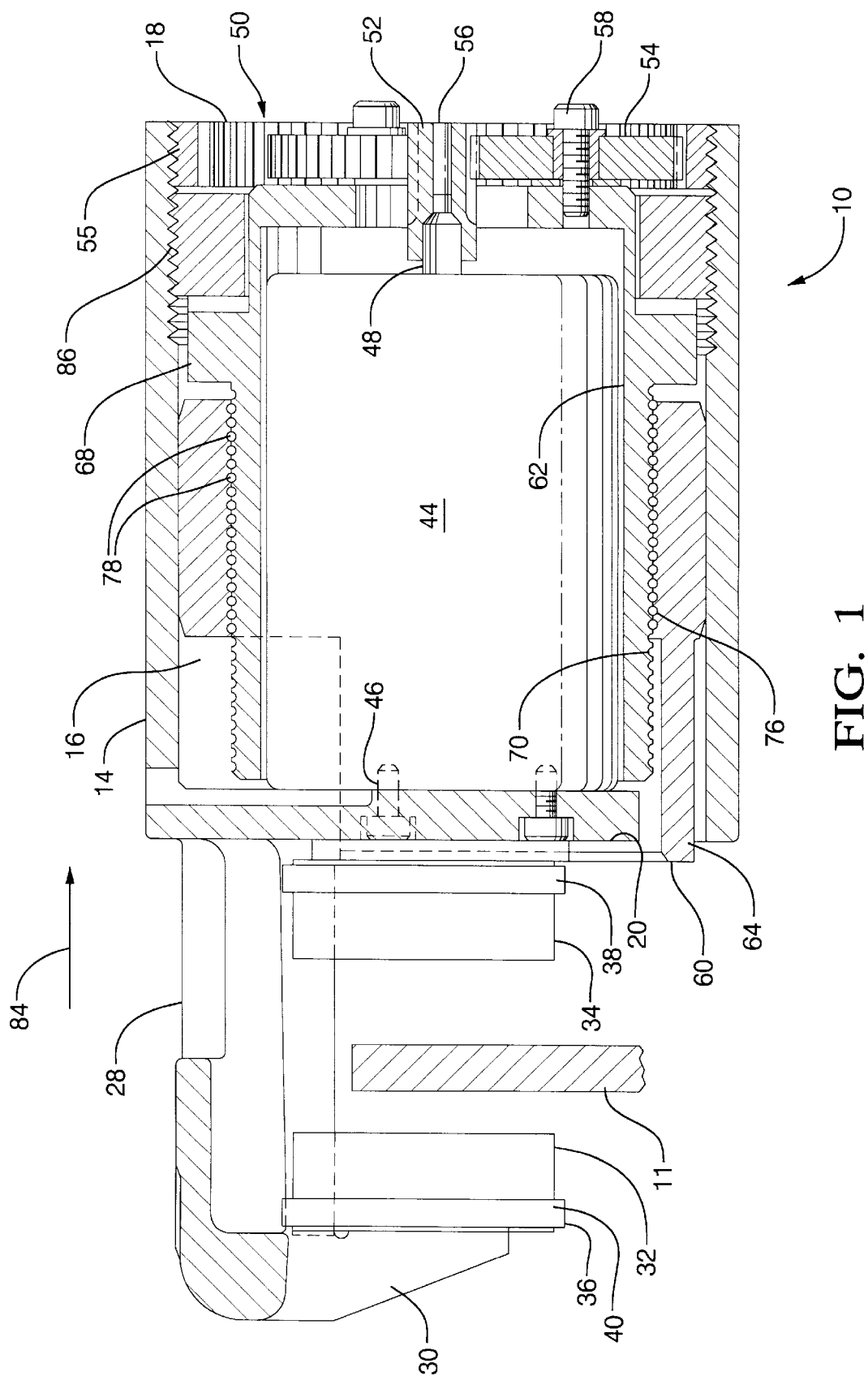
FIG. 1 is a fragmentary elevational view of an electric caliper, according to the present invention.

Referring to the drawings and in particular FIG. 1, one embodiment of an electric caliper 10, according to the present invention, is shown for a brake system such as of the disc brake type to slow or stop rotation of a wheel (not shown) of a motor vehicle. At the outset, it will be apparent to one skilled in the art that the present invention, though disclosed for the wheel of the motor vehicle (not shown), is applicable to other types of rotating members.

The brake system includes a brake pedal, (not shown) which communicates a signal from a driver (not shown) to the electric caliper 10. Rotation of a disc or rotor 11 is slowed down or stopped by engaging the electric caliper 10 which displaces a pair of resilient friction elements (to be described) that engage the disc 11.

Figure 3:
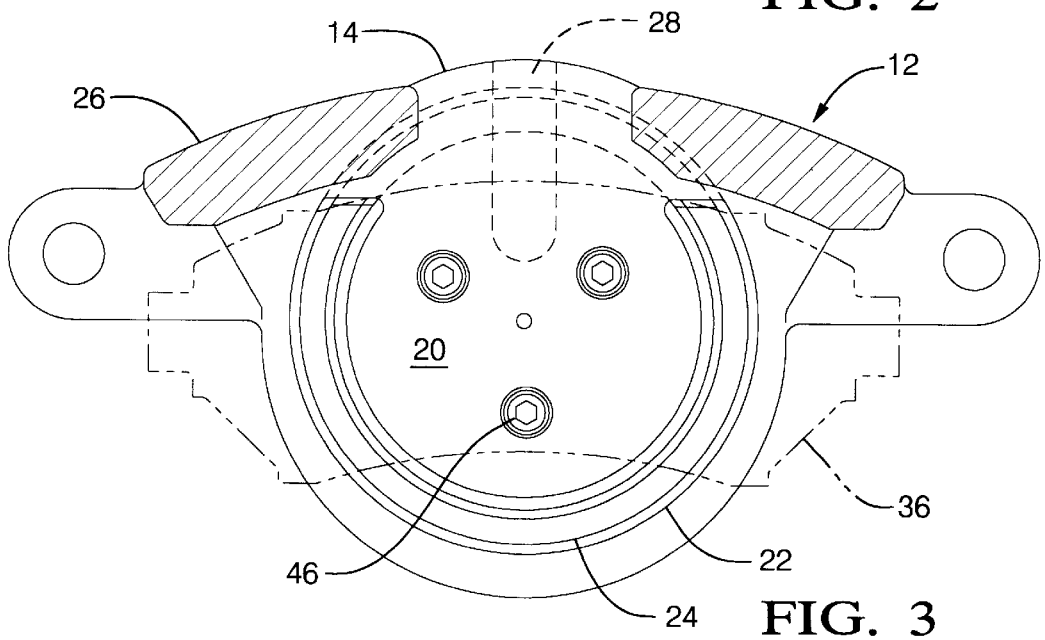
FIG. 3 is a front end view of the electric caliper of FIG. 1.

The electric caliper 10 includes a cylindrical housing 14 having a bore 16 therein. The housing 14 has a rear end 18 which is open and a front end 20 which is closed. As illustrated in FIG. 3, the front end 20 includes an aperture 22 corresponding in shape to a piston 24 to be described. As illustrated in FIGS. 1 and 3, the housing 14 includes a flange 26 extending radially from the front end 20 of the housing 14. The housing 14 also includes an L-shaped bridge 28 extending transversely from the front end 20 of the housing 14. The bridge 28 has a leg 30 to move or displace an outer brake pad 32 as will be described.

The electric caliper 10 includes a generally U-shaped brake pad attachment bracket 36, as is well known in the art, positioned around the bridge 28. The attachment bracket 36 is operatively attached to the housing 14. For example, a rod (not shown, but known in the art) interconnects the housing 14 and the attachment bracket 36, such that the housing 14 is slidable, transversely, along the rod, as will be described. It should be appreciated that the attachment bracket 36 is also fixedly attached to vehicle structure of the motor vehicle.

The electric caliper 10 includes an inner brake pad 34 extending radially from an inner attachment bracket leg 38 closest to the housing 14, and an outer brake pad 32 extending radially from an outer attachment bracket leg 40 farthest from the housing 14. The disc 11 is disposed between the outer and inner brake pad 32, 34. It should be appreciated that, in this example, the electric caliper 10 is of the floating type. During braking, the inner brake pad 34 engages the disc 11. The resulting reactionary force pulls outer brake pad 32 into engagement with the disc 11. The engagement of the inner and outer brake pads 34, 32 with the disc 11 slows down the wheel or holds the wheel in a fixed position.

Figure 2:
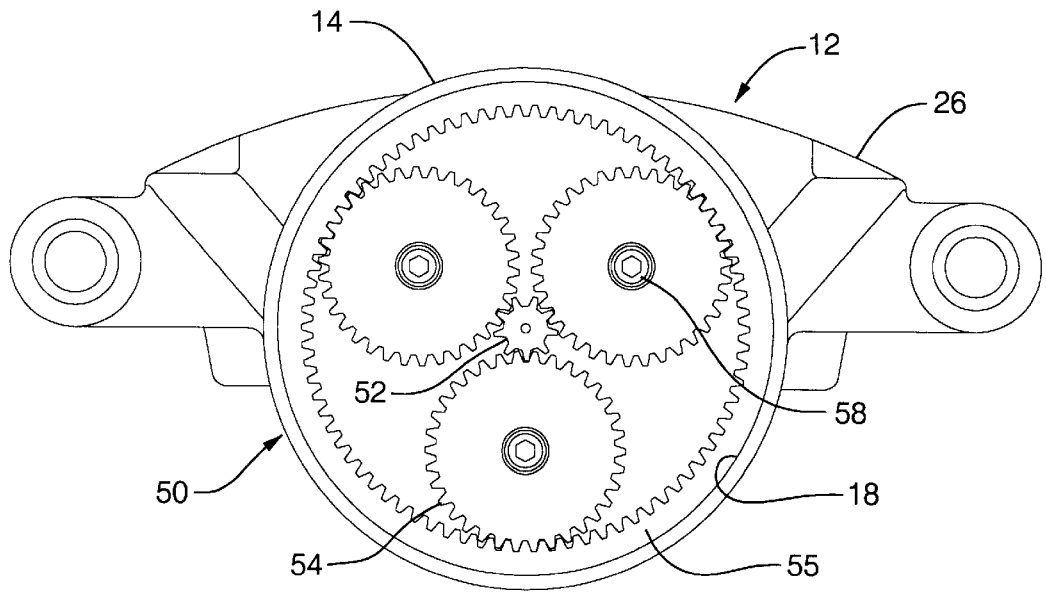
FIG. 2 is a rear end view of the electric caliper of FIG. 1.

Referring to FIGS. 1 through 3, the electric caliper 10 also includes a motor 44 for controlling the engagement of the inner brake pad 32 and outer brake pad 34. The motor 44 is positioned within the bore 16 in the housing 14. The motor 44 is mounted within the housing 14 preferably by fastening with fasteners such as bolts 46 to the front end 20 of the housing 14. Advantageously, positioning the motor 44 inside the housing 14 allows the selection of a motor 44 with a more efficient geometry. In this example, a longer, thinner motor 44 is preferable. The motor 44 includes a shaft 48 extending axially from the back of the motor 44 and through the rear end 18 of the housing 14.

The electric caliper 10 includes a gear system 50 operatively connected to the shaft 48 and positioned on the rear end 18 of the housing 14. The gear system 50 provides a gear reduction from the motor 44 to a ball screw 60 to be described. Preferably, the gear system 50 is a planetary gear system, a variety well known in the art. The planetary gear system 50 includes a central pinion gear 52 that rotatably engages a plurality of planetary gears 54, as is known in the art. The planetary gears 54 travel about a ring gear 55 fixed to the housing 14. In this example, the planetary gear system 50 includes one pinion 52 and three planetary gears 54. The planetary gears 54 provide a 16:1 reduction, the total gear reduction for the system 50 is 16×16. The pinion gear 52 is operatively connected to the end of the shaft 48, by fastening with a fastener such as a bolt 56. The rotation of the shaft 48 causes the pinion gear 52 to rotate which, in turn, causes the planetary gears 54 to rotate. The planetary gears 54 are operatively connected to a ball screw 60 by fastening with a fastener such as a bolt 58.

As illustrated in FIGS. 4 through 8, the electric caliper 10 includes a ball screw 60, as is well understood in the art, as another means of gear reduction. Typically, a relatively large ball screw 60 is necessary to transfer a load ranging between 12,000 lb. to 15,000 lb. of force, and space within the wheel well is limited. However, by positioning the ball screw 60 around the motor 44 and inside the bore 16 in the housing 14, the size of the ball screw 60 is effectively increased. Advantageously, the reduced pitch of the ball screw 60 and the larger number of balls increase its load carrying capability.

Figure 6:
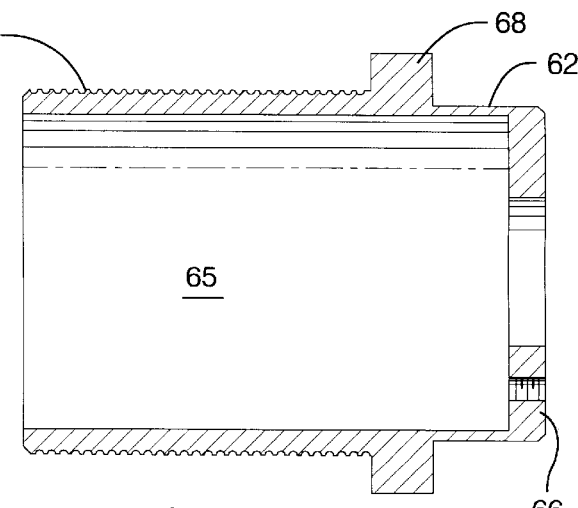
FIG. 6 is a fragmentary view of a screw portion of the ball screw of FIG. 4.

The ball screw 60 includes a threaded screw portion 62 and a threaded nut portion 64 operably engaging a threaded screw portion 62. As illustrated in FIG. 6, the rotational displacement of the screw portion 62 of the ball screw 60 results in the transverse displacement of the nut portion 64. The screw portion 62 is generally cylindrical, with an axially extending bore 65. The screw portion 62 has a closed end 66. The closed end 66 of the screw portion 62 is operatively connected to the planetary gears 54 with a fastener such as a bolt 58. The screw portion 62 includes a radially extending stop portion 68. The stop portion 68 limits the displacement of the nut portion 64. The outer surface of the screw portion 62 includes a helically-shaped groove 70 cut into it.

Figure 8:
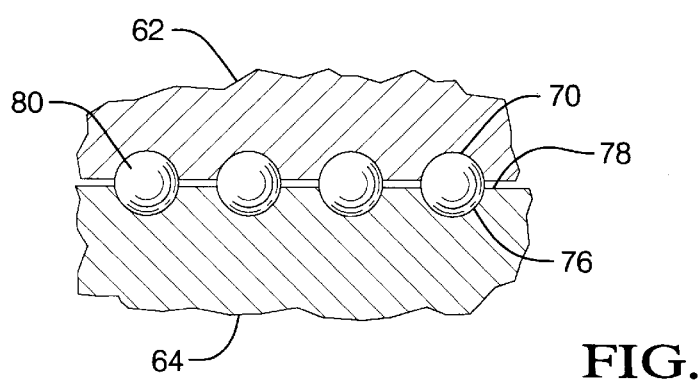
FIG. 8 is an enlarged view of a ball race of the ball screw of FIG. 4.
Figure 4:
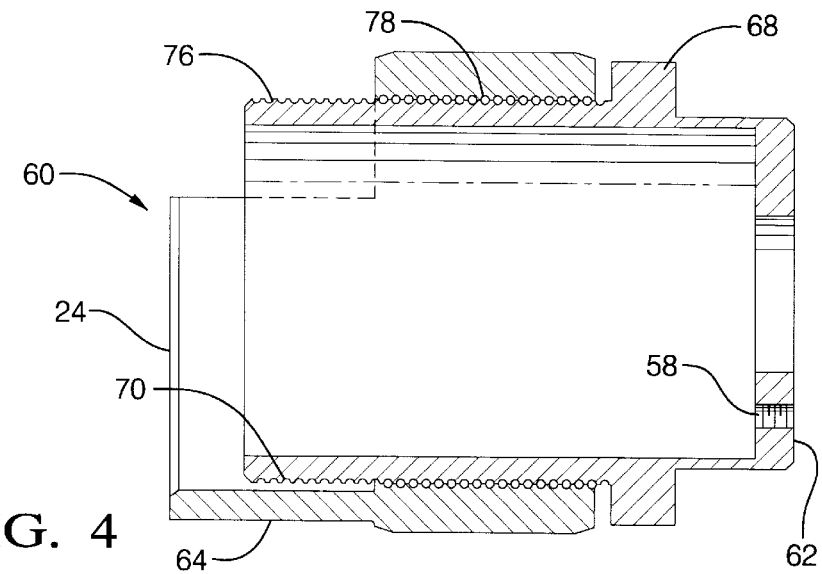
FIG. 4 is a fragmentary view of a ball screw of the electric caliper of FIG. 1.
Figure 5:
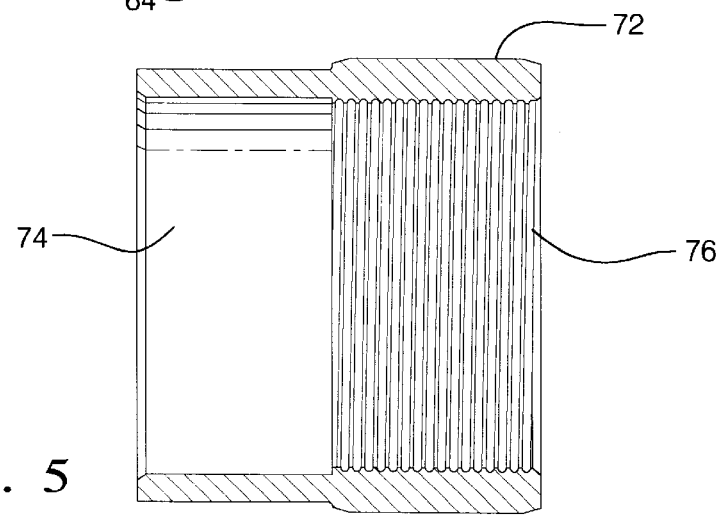
FIG. 5 is a fragmentary view of a ball screw nut of the ball screw of FIG. 4.
Figure 7:
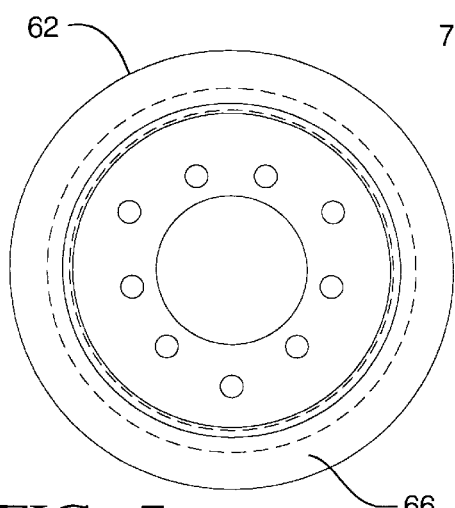
FIG. 7 is an end view of the screw portion of FIG. 6.

As illustrated in FIG. 5, the nut portion 64 is also generally cylindrical, with an axially extending bore 74. The nut portion 64 is open at each end. The nut portion 64 includes a helically-shaped groove 76 cut into the inner surface of the nut portion 64 and complimentary with the groove 70 in the outer surface of the screw portion 62. It should be appreciated that the groove 70 in the screw portion 62 and the groove 76 in the nut portion 64 cooperatively form a pathway 78 or ball race, as illustrated in FIG. 8. The ball screw 60 also includes rolling elements 80, such as spherical balls as is known in the art. The balls 80 travel through the ball race 78 in a manner to be described.

The nut portion 64 has an end 82 operatively connected to the piston 24, preferably having a U-shape, positioned at the front end 20 of the housing 14. The piston 24 is displaced transversely away from the housing 14 through the aperture 22 in the front end 20, to push the inner brake pad 34 against the disc 11.

The electric caliper 10 also includes an annular thrust bearing 86 positioned around the ball screw 60, adjacent an opposite side of the stop portion 68 from the nut portion 64. The thrust bearing 86 is operatively connected to the housing 14.

In operation, a brake pedal is electrically connected to the electric caliper 10. The application of a force to the brake pedal initiates operation of the motor 44. The operation of the motor 44 rotates the shaft 48, which in turn rotationally engages the pinion gear 52 in the planetary gear system 50. The rotation of the pinion gear 52 drives the planetary gears 54 about the ring gear 55. The rotation of the planetary gears 54 rotates the screw portion 62 of the ball screw 60. The rotation of the screw portion 62 initiates rolling of the balls 80 in the ball race 78, to displace the nut portion 64 linearly away from the housing 14. The nut portion 64 displaces the piston 24 linearly away from the housing 14. The displacement of the piston 24 engages the inner brake pad 34 with the disc 11. The resulting pressure that builds up from the inner brake pad 34 against the disc 11 creates a reactionary force 84. The reactionary force 84 is transmitted back into the housing 14 through the rod and into the thrust bearing 86. The housing 14 is displaced in the direction away from the disc 11, so that the bridge 28 pulls the outer brake pad 32 toward the disc 11, until both the inner brake pad 34 and outer brake pad 32 are exerting pressure on the disc 11 to slow down or stop the rotation of the wheel.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An electric caliper for a brake system comprising:

a cylindrical housing having a bore;

a bridge extending from said housing;

a pair of friction elements operatively disposed under said bridge;

a motor disposed within said bore;

a planetary gear system disposed within said bore and operatively connected to said motor;

a ball screw disposed within said bore and positioned around said motor and operatively connected to said planetary gear system such that the motor is contained within the ball screw and disposed between the planetary gear system and the friction elements; and a piston operatively connected to said ball screw, wherein displacement of said piston causes said friction elements to operatively engage a disc of the brake system disposed between said friction elements.

2. An electric caliper as set forth in claim 1 wherein said ball screw includes a screw portion and a nut portion operatively connected to said screw portion.

3. An electric caliper as set forth in claim 2 wherein said screw portion includes a helically shaped groove cut into an outer surface of said screw portion and said nut portion includes a corresponding helically shaped groove cut into an inner surface of said nut portion, and a plurality of rolling elements disposed in said grooves.

4. An electric caliper as set forth in claim 2 wherein said nut portion is connected to said piston.

5. An electric caliper as set forth in claim 1 wherein said front end of said housing includes an aperture for said piston to extend therethrough.

6. An electric caliper as set forth in claim 1 wherein said planetary gear system includes a pinion gear, a plurality of planetary gears and a ring gear.

7. An electric caliper as set forth in claim 6 wherein said motor is connected to said pinion gear.

8. An electric caliper as set froth in claim 6 wherein said planetary gears are connected to said ball screw.

9. An electric caliper for an electric brake system comprising:
   a cylindrical housing having a bore, wherein a rear end of said housing is open and a front end of said housing is closed;
   a bridge extending transversely from said housing, wherein a pair of friction elements are operatively disposed under said bridge;
   a motor positioned within said bore in said housing;
   a planetary gear system positioned on said rear end of said housing and operatively connected to said motor;
   a ball screw positioned around said motor within said bore in said housing and operatively connected to said planetary gear system such that the motor is contained within the ball screw and disposed between the planetary gear system and the friction elements, wherein said ball screw includes a screw portion and a nut portion operatively connected to said screw portion; and
   a piston operatively connected to said nut portion, wherein displacement of said piston causes said friction elements to operatively engage a disc of the brake system disposed between said friction elements.

10. An electric caliper as set forth in claim 9 wherein said planetary gear system comprises a ring gear, a plurality of planetary gears and a pinion gear that drives said planetary gears, wherein said motor is operatively connected to said pinion gears.

11. An electric caliper as set forth in claim 10 wherein said screw portion includes a helically shaped groove cut into an outer surface of said screw portion and said nut portion includes a corresponding helically shaped groove cut into an inner surface of said nut portion, and a plurality of rolling elements disposed in said grooves that operatively translate a rotational displacement of said screw portion into a transverse displacement of said nut portion.

12. An electric caliper as set forth in claim 9 wherein said front end of said housing includes an aperture for said piston to extend therethrough.

13. An electric caliper as set forth in claim 10 wherein said motor is connected to said pinion gear.

14. An electric caliper for an electric disc brake system comprising:
   a cylindrical housing having a bore, wherein a rear end of said housing is open and a front end of said housing is closed;
   a bridge extending transversely from said housing, wherein a pair of resilient friction elements are operatively positioned under said bridge for engaging a disc disposed between said friction elements;
   a motor positioned within said bore in said housing;
   a planetary gear system positioned within said bore on said rear end of said housing and having a pinion gear, a ring gear and a plurality of planetary gears, wherein said motor is operatively connected to said p in ion gear;
   a ball screw positioned around said motor within said bore in said housing and operatively connected to said planetary gears such that the motor is contained within the ball screw and disposed between the planetary gear system and the friction elements, wherein said ball screw includes a screw portion and a nut portion;
   said screw portion including a helically shaped groove cut into an outer surface of said screw portion and said nut portion including a corresponding helically shaped groove cut into an inner surface of said nut portion and a plurality of rolling elements disposed in said grooves that operatively translate a rotational displacement of said screw portion into a transverse displacement of said nut portion; and
   a piston operatively connected to said nut portion and extending therethrough a corresponding aperture in said front end of said housing.

\* \* \* \* \*